June 24, 1969   M. W. FORTH   3,451,333
BALE THROWER
Original Filed Dec. 6, 1957   Sheet 1 of 2
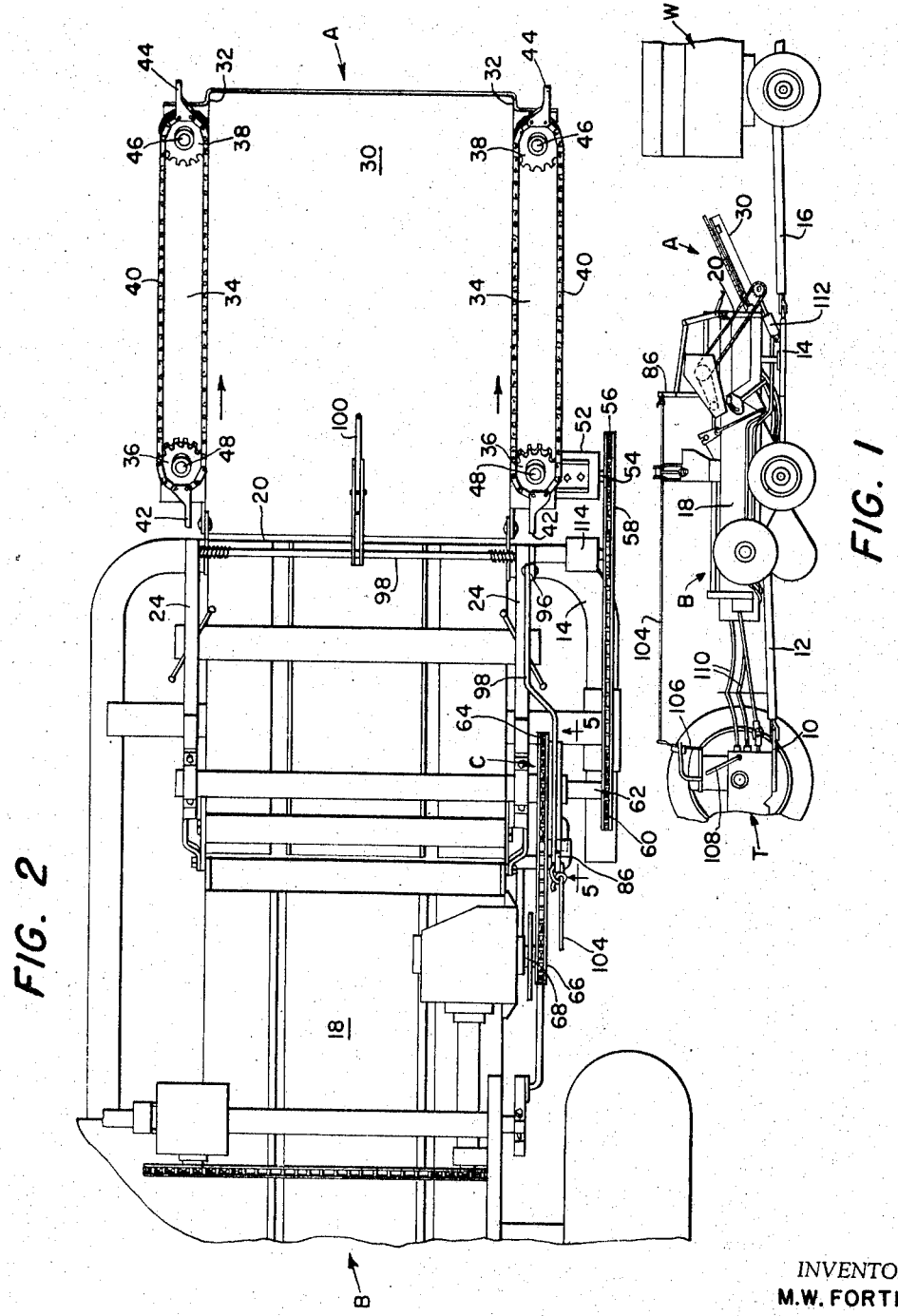
INVENTOR.
M.W. FORTH

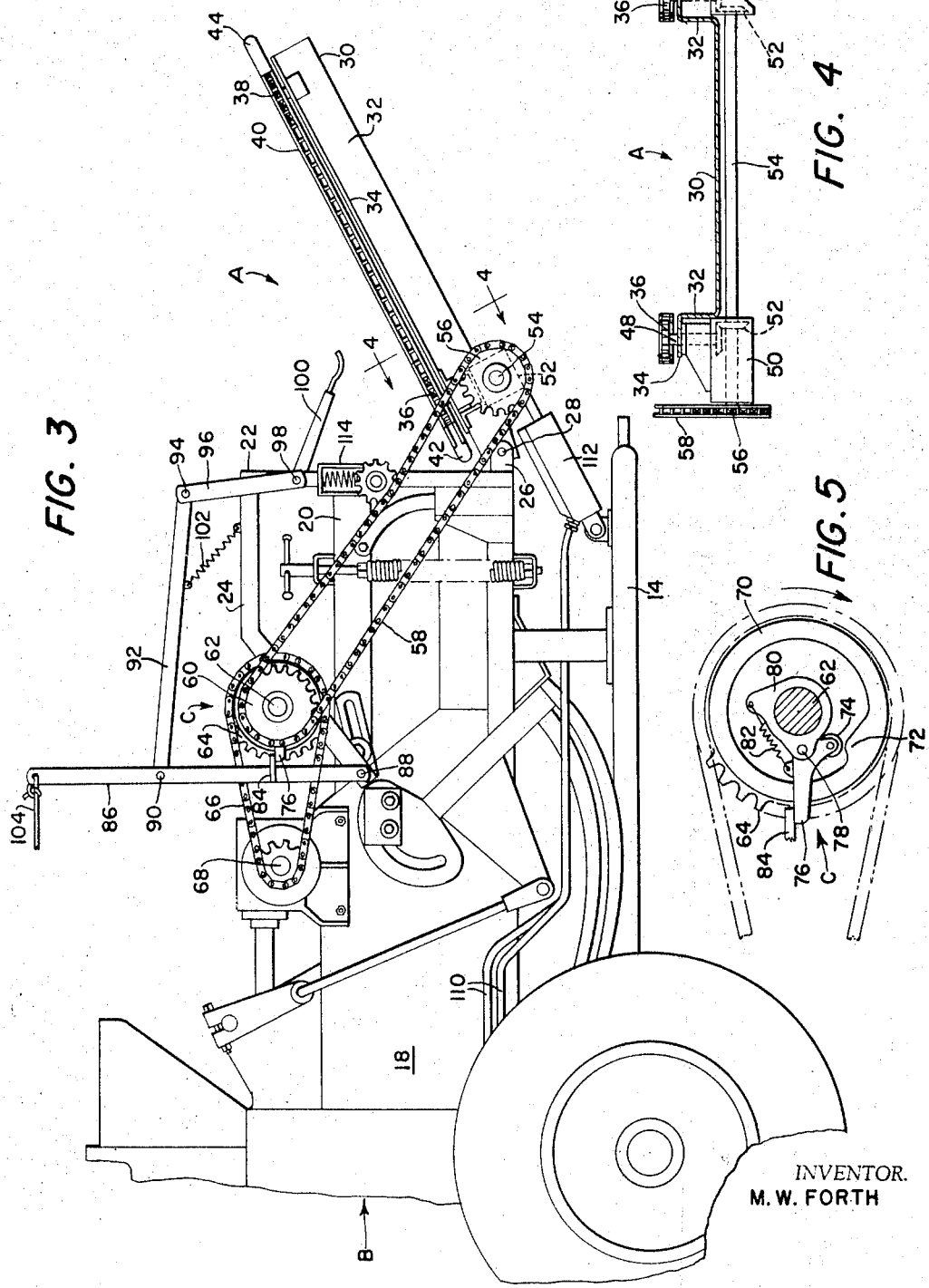

United States Patent Office

3,451,333
Patented June 24, 1969

1

3,451,333
BALE THROWER
Murray W. Forth, Moline, Ill., assignor, by mesne assignments, to Deere & Company, a corporation of Delaware
Continuation of application Ser. No. 701,040, Dec. 6, 1957. This application Mar. 11, 1964, Ser. No. 351,889
Int. Cl. A01f *15/08, 17/00*
U.S. Cl. 100—188     17 Claims This invention relates to a material-handling apparatus and more particularly to a machine adapted for use in conjunction with an agricultural baler for the purpose of receiving bales from the baler and throwing them to a trailing or otherwise associated vehicle.

This application is a continuation of copending application Ser. No. 701,040, filed Dec. 6, 1957, now abandoned.

The invention has for a principal object a provision of an improved machine affording a variation of the apparatus disclosed and claimed in the U.S. Patent to Morrison 2,756,865 and aims in one respect to provide a machine having a lower silhouette, novel bale-throwing elements incorporating a bale-receiving support flanked by throwing elements in the form of chains or equivalent means, novel drive means for the throwing means and means for adjusting the bale-receiving support so as to vary the trajectory of the throw bales.

The foregoing and other important objects and desirable features inherent in and encompassed by the invention will become apparent as a preferred embodiment thereof is disclosed in detail in the ensuing description and accompanying sheets of drawings, the several figures of which are described immediately below.

FIG. 1 is a side elevational view, on a materially reduced scale, showing a vehicle train made up of a tractor, a baler and a trailer or wagon.

FIG. 2 is an enlarged fragmentary plan view of a rear portion of the baler and throwing apparatus.

FIG. 3 is a side elevational view of the structure shown in FIG. 2.

FIG. 4 is a section as seen along the line 4—4 of FIG. 3.

FIG. 5 is an enlarged section showing the clutch, as seen along the line 5—5 of FIG. 2.

The representative vehicle train shown in FIG. 1 is made up of a typical agricultural tractor T, a baler B and a wagon W. The tractor has a conventional draw bar 10 which affords a draft connection to a tongue 12 of the baler. The baler has a wagon hitch 14 which is connected to the tongue 16 of the wagon. The vehicle train thus afforded is operated in conventional manner in the pick-up means on the baler accumulates windrows of hay and causes the hay to move into a bale case or chamber 18, wherein the hay is accumulated and tied in successive bales to be discharged at the rear end discharge portion 20 of the bale case 18. As the bales are successively ejected at the discharge portion, they are received by bale throwing apparatus, indicated in its entirety by the letter A, which performs cyclically to throw bales in succession rearwardly and upwardly into the wagon W.

The bale-throwing apparatus is preferably afforded as an attachment for existing balers; although, the possibility of building the apparatus directly onto balers in the first place is not excluded. Considered as an attachment, however, for purposes of the present description, it will be seen that appropriate supporting structure adapts the apparatus for mounting on the bale case. The structure includes rear upright members 22 and laterally spaced apart fore-and-aft members 24 which may be rigidly mounted on the bale case in any suitable manner not important here. The lower portions of the upright members 22 afford brackets 26 which, by means of a transverse pivot 28, carry a rearwardly and upwardly extending bale-receiving support in the form of a chute 30. The floor of the chute is what may be considered an extension of the bale case floor so that as bales emerge from the bale case discharge portion 20, they enter onto the chute 30 and, by means to be presently described, are moved upwardly and rearwardly or in the direction of ultimate delivery to the wagon W and are then thrown into the wagon.

The chute has opposite fore-and-aft sides 32 which are flanged outwardly at 34 to provide supports for front and rear sprockets or rotary members 36 and 38 respectively. At this point, it should be observed that such expressions as "front," "rear" etc., are used in the interests of clarity and convenience and not by way of limitation, since the structure may be disposed otherwise than as illustrated. The preferred embodiment is based on the conventional rearward discharge of bales from what is known as an in-line baler.

Each front sprocket 36 is proximate to the bale-discharge portion 20 and each rear sprocket 38 is remote from that portion. Each pair of fore-and-aft alined sprockets carries an endless flexible element in the form of a drive chain 40 which has thereon a pair of bale-engaging members or lugs 42 and 44. The chains are arranged so that their inner runs travel rearwardly, as indicated by the arrows in FIG. 2. When the chains are initially positioned, the lugs 42 and 44 may be disposed as illustrated in FIG. 2, the lugs 42 being transversely alined in what may be considered starting positions. The lugs 44 are in positions that will be replaced by the lugs 42 when the lugs 42 move to their delivery positions, the details of which will presently appear. The rear sprockets 38 are respectively approriately journaled on idler shafts 46 and the front sprockets are respectively keyed to generally upright drive shafts 48. These shafts depend into gear boxes 50 containing suitable bevel gearing 52, for example, driven in unison by drive means including a transverse drive shaft 54. The bevel gearing is oppositely arranged so that the chains are driven in the directions previously described. The shaft 54 projects at one side through the proximate gear box and has keyed to its outer end an input drive member or sprocket 56 which is driven, as by a chain 58, from a sprocket 60 on an intermittently rotatable power shaft 62 that is journaled on the fore-and-aft frame members 24 of the supporting structure.

Intermittent operation of the bale-throwing apparatus is effected by means of a conventional one-revolution clutch indicated in its entirety at C (best shown in FIG. 5) and comprising, in addition to the intermittently rotating part represented by the shaft 62, a constantly rotating part or sprocket 64. This sprocket is chain driven at 66 from any suitable output shaft, as at 68, on the baler. The sprocket 64 has secured thereto a clutch drum 70 which has an internal drive lug 72 with which a clutch dog roller 74 is engageable and disengagable. The roller 74 is carried by a clutch dog 76 which in turn is pivoted at 78 to a hub 80 fixed to the shaft 62 and is biased by a spring 82 in the direction of engagement with the drive lug 72. However, as is typical in clutches of this type, disengagement is effected by holding the clutch dog 76 in a direction counter to the direction of rotation of the sprocket 64 (arrow, FIG. 5). This is accomplished by a lug 84 on a control lever 86, which is pivoted at 88 to the supporting structure or bale case, as desired. The disengaged condition of the clutch mechanism is illustrated in the drawings.

The clutch lever 86 is pivotally connected at 90 to a rearwardly extending link 92 which in turn is connected at its rear end at 94 to an arm 96 which is rigid on a transverse rockshaft 98. This rockshaft extends between the uprights 22 of the supporting structure and intermediate its ends has rigidly secured thereto a rearwardly extending bale-sensing element or feeler 100. A spring 102 biases the lever and link structure to the position shown in FIG. 3, in which position the lug 84 on the lever 86 provides an obstacle to movement of the clutch dog 76 in the direction in which it is urged by the clutch dog spring 82, consequently maintaining the disengaged position of the clutch. The feeler 100 extends rearwardly and in a position to be engaged by an emerging bale as it starts up the chute 62 under the impetus of a succeeding bale in the bale case. When the chute-receive bale attains a certain position, it displaces the feeler 100 upwardly, which rocks the rockshaft 98 in a counterclockwise direction to apply a forward force on the lever 86 via the arm 96 and the link 92, removing the lever lug 84 as an obstacle to the clutch dog 76 whereupon the clutch dog spring 82 pulls the clutch dog in a clockwise direction and thus places the roller 74 in a position to be engaged by the lug 72. With the clutch C engaged, the chains 40 are driven in the directions shown in FIG. 2 so that the inner runs travel rearwardly. The front lugs 42 are thus moved from their starting positions and into engagement with the chute-received bale, and as the drive is continued, the lugs 42 move rearwardly to delivery positions just inwardly respectively of the position initially occupied by the rear lugs 44. At this point, the bale is traveling relatively rapidly and as the lugs 42 turn outwardly, they operate as rotary devices and are accelerated, because of their terminal ends move faster than the chains. The impetus thus given to the bale causes the bale to be thrown distantly rearwardly and thus into the wagon W. As the chute-carried bale moves rearwardly, it moves out from beneath the feeler 100 so that the feeler returns to its initial position via the spring 102, and this of course returns the lever 86 to a position in which the lug 84 is again adapted to engage the clutch dog 76 as the engaged clutch completes the one-revoltuion previously initiated, whereupon the clutch is again disengaged and the bale-throwing elements or chains 40 will stop with the lugs 44 now at the forward positions and the lugs 42 at the rear positions. In other words, the drive ratio is such that one-revolution of the clutch will drive the chains so as to interchange the positions of the lugs 42 and 44. This is, of course, a preferred example and the arrangement may be otherwise; for example, the ratio may be one-to-one and each chain may have a single lug, as the lug 42.

The lever 86 may also be manually operated, as by a pull rope 104 which extends forwardly to the tractor so as to be available to an operator on the tractor seat 106. Thus, the operator may manually trip the clutch prior to the time that it would automatically be tripped by the feeler 100, which is important in effecting throwing of the bale prematurely as when the vehicle train is turning a corner and in which instance delay for the automatic trip might cause the bale to miss the wagon because of angular misalinement between the wagon and baler.

The tractor is typically provided with a hydraulic power system, such as that forming the subject matter of the U.S. Patent to Jirsa 2,532,552. The hydraulic power system is here operated by a valve lever 108 for controlling the supply of fluid under pressure via conduits or hoses 110 selectively to opposite ends of hydraulic cylinder end piston assembly 112 that is connected between the wagon hitch 14 on the baler and the underside of the chute 32. Extension and retraction of the cylinder unit will enable up and down swinging of the chute so as to vary the trajectory of the thrown bale. When the system is hydraulically locked the cylinder unit is fixed and this will maintain the adjusted position of the chute. A spring loaded idler is appropriately associated with the drive chain 58 to accommodate changes in distance between the shafts 54 and 62 as the chute 32 is adjusted. If desired, the bracket 26 may be extended to mount the chute 32 on the supports 22 at the axis of the cross shaft 54, so that the shaft and axis of swinging will be coincident. Either arrangement may be used while retaining the benefits of the invention.

The operation of the mechanism will be apparent from the preceeding description and it need not be reiterated. Likewise, the salient features of the invention have been described. Features other than these will readily occur to those versed in the art, as will variations in the preferred embodiment of the invention disclosed, all of which may be achieved without departure from the spirit and scope of the invention.

What is claimed is:

1. For a baler having bale-forming means including a bale-discharge portion from which individual completed bales emerge rearwardly in succession as the baler operates: bale-throwing apparatus for throwing each emerging bale distantly rearwardly from the bale-discharge portion of the baler, comprising: a bale support having means thereon for connection thereof to the baler and extending rearwardly from the bale-discharge portion and having opposite fore-and-aft sides; a pair of bale-throwing means on the support and respectively along said sides to receive an emerging bale therebetween, each bale-throwing means including front and rear sprockets respectively adjacent to and remote from the bale-discharge portion and an endless chain trained about said sprockets to dispose an inner run of the chain in flanking relation to one side of an emerging bale, each chain having a driving lug thereon assuming a starting position adjacent to its front sprocket and said lugs in their starting positions being transversely alined so that an emerging bale enters between the respective inner runs of the chain to be engaged by the lugs; drive means interconnecting the two bale-throwing means so that the inner runs of the chains move rearwardly in unison to carry the lugs rearwardly to delivery positions at their respective rear sprockets, said lugs turning thence laterally oppositely outwardly about said rear sprockets and thereby accelerating to cause the bale to depart rearwardly by its own momentum; selectively engageable and disengageable power-operated mechanism on the baler and connected to the drive means, said mechanism being disengaged when the lugs are in their starting positions and engageable to drive the chains to carry the lugs to their delivery positions and back to their starting positions; and control means for effecting engagement of the power-operated mechanism, including a bale-sensing device operative automatically, in response to a bale-forming condition including emergence of a bale to said support, to engage the mechanism for driving the chains as aforesaid.

2. For a baler having bale-forming means including a bale-discharge portion from which individual completed bales emerge rearwardly in succession as the baler operates: bale-throwing apparatus for throwing each emerging bale distantly rearwardly from the bale-discharge portion of the baler, comprising: a bale support having means thereon for connection thereof to the baler and extending rearwardly from the bale-dicharge portion and having opposite fore-and-aft sides; a pair of bale-throwing means on the support and respectively along said sides to receive an emerging bale therebetween, each bale-throwing means including a rotatable device having a lug adapted to engage one side of an emerging bale, said lugs operating in unison and having starting positions transversely alined to enable emergence of a bale therebetween and said devices being operative to carry the lugs rearwardly in unison to move the bale rearwardly therewith, said devices then carrying the lugs oppositely laterally outwardly to cause acceleration thereof so as to throw the bale rearwardly beyond said devices; device means interconnecting the two bale-throwing means so that the two devices operate in unison as aforesaid and to thereafter return the lugs to their starting positions; selectively engageable and disengageable power-operaed mechanism on the baler and connected to the drive means, said mechanism being disengaged when the lugs are in their starting positions and engageable to drive the devices to carry the lugs rearwardly from and then back to their starting positions; and control means for effecting engagement of the power-operated mechanism, including a bale-sensing device operative automatically, in response to a bale-forming condition including emergence of a bale to said support to engage the mechanism for driving the devices as aforesaid.

3. For a baler having bale-forming means including a bale-discharge portion from which individual completed bales emerge in succession as the baler operates: bale-throwing apparatus for throwing each emerging bale distantly from the bale-discharge portion of the baler, comprising: a baler support having means thereon for connection thereof to the baler and extending from the bale-discharge portion in the direction of ultimate bale delivery; a pair of bale-throwing means on the support and spaced apart crosswise of the path of an emerging bale to receive an emerging bale therebetween, each bale-throwing means including a rotatable device having a lug adapted to engage one side of an emerging bale, said lugs operating in unison and having starting positions transversely alined to enable emergence of a bale therebetween and said devices being operative to carry the lugs in the direction of bale delivery and in unison to move the bale therewith in said direction, said devices then carrying the lugs oppositely laterally outwardly to cause acceleration thereof so as to throw the bale in said direction and beyond said devices; drive means interconnecting the two bale-throwing means so that the two devices operate in unison as aforesaid and to thereafter return the lugs to their starting positions; selectively engageable and disengageable power-operated mechanism on the baler and connected to the drive means, said mechanism being disengaged when the lugs are in their starting positions and engageable to drive the devices to carry the lugs from and then back to their starting positions; and control means for effecting engagement of the power-operated mchanism, including a bale-sensing device operative automatically, in response to a bale-forming condition including emergence of a bale to said support to engage the mechanism for driving the drive means as aforesaid.

4. For a baler having bale-forming means including a bale-discharge portion from which individual completed bales emerge in succession as the baler operates: bale-throwing apparatus for throwing each enemerging bale distantly from the bale-discharge portion of the baler, comprising: a bale support having means thereon for connection thereof to the baler and extending outwardly from the bale-discharge portion in the direction of ultimate bale delivery; a pair of parallel bale-throwing means generally coextensive with the bale-receving means and spaced apart thereon transverse to the path of an emerging bale to receive such emerging bale between them, each bale-throwing means including inner and outer mounting members on the bale-receiving means respectively adjacent to and remote from the bale-discharge portion and an endless flexible element trained about said mounting means to dispose an operative run of said element along said bale-receiving means; bale-engaging lugs respectively on the elements and normally alined transversely of the path of the emerging bale to assume starting positions from which said lugs are simultaneously carried outwardly by their respective operative runs to engage and move the bale outwardly in the direction of bale delivery, said lugs moving respectively about the outer mounting means in opposite directions transverse to the path of bale movement and accelerating thereat to cause the bale to depart therefrom by its own momentum; and power-operated mechanism drivingly connected to the bale-throwing means for driving the elements to cause the lugs to move from their starting positions as aforesaid to throw the bale and back to said starting positions to receive another bale.

5. The invention defined in claim 4, including: control means deenergizing the power-operated mechanism with the lugs in their starting positions; and means operative in response to the presence of an emerging bale to cause the control means to energize the power-operated mechanism for throwing the bale and to deenergize said mechanism when the lugs return to said starting positions.

6. For a baler having bale-forming means including a bale-discharge portion from which individual completed bales emerge rearwardly in succession as the baler operates: bale-throwing apparatus for throwing each emerging bale distantly rearwardly from the bale-discharge portion of the baler, comprising: a bale support having means thereon for connection thereof to the baler and extending rearwardly from the bale-discharge portion; bale-throwing means on the support and including front and rear sprockets respectively adjacent to and remote from the bale-discharge portion and an endless chain trained about said sprockets to dispose one run of said chain along the support and parallel to an emerging bale, said chain having a lug thereon assuming a starting position adjacent to the front sprocket and operative when said run travels rearwardly to travel with said run for engaging an emerged bale for moving said bale rearwardly, said lug attaining a delivery position in which it turns about the rear sprocket and away from the bale to thereby accelerate so that the bale is thrown rearwardly beyond said rear sprocket, said lug then returning to its starting position to be conditioned to receive another bale; selectively engageable and disengageable power-operated mechanism on the baler and connected to the bale-throwing means, said mechanism being disengaged when the lug is in its starting position and engageable to drive the chain as aforesaid to carry the lug from its starting position and return to said starting position; and control means for effecting engagement of the power-operated mechanism, including a bale-sensing device operative automatically, in response to a bale-forming condition including emergence of a bale to said support to engage the mechanism for driving the chain as aforesaid.

7. For a baler having bale-forming means including a bale-discharge portion from which individual completed bales emerge in succession as the baler operates; bale-throwing apparatus for throwing each emerging bale distantly from the bale-discharge portion of the bale, comprising: a bale support having means thereon for connection thereof to the baler and extending from the bale-discharge portion; bale-throwing means on the support and including proximate and remote sprockets respectively adjacent to and remote from the bale-discharge portion and an endless chain trained about said sprockets to dispose one run of said chain along the support and parallel to an emerging bale, said chain having a lug thereon assuming a starting position adjacent to the front sprocket and operative when said run travels in the direction of bale delivery to travel with said run for engaging an emerged bale for moving said bale in said direction, said lug attaining a delivery position in which it turns about the remote sprocket and away from the bale to thereby accelerate so that the bale is thrown further in said direction and beyond said remote sprocket, said lug then returning to its starting position to be conditioned to receive another bale; selectively engageable and disengageable power-operated mechanism on the baler and connected to the bale-throwing means said mechanism being disengaged when the lug is in its starting position and engageable to drive the chain as aforesaid to carry the lug from its starting position to its delivery position and return to said starting position; and control means for effecting engagement of the power-operated mechanism, including a bale-sensing device operative automatically, in response to a bale-forming condition including emergence of a bale to said support to engage the mechanism for driving the chain as aforesaid.

8. For a baler having bale-forming means including a bale-discharge portion from which individual completed bales emerge in succession as the baler operates; bale-throwing apparatus for throwing each emerging bale distantly from the bale-discharge portion of the baler, comprising: a bale support having means thereon for connection thereof to the baler and extending from the bale-discharge portion; bale-throwing means on the support and including a rotatable device having a lug adapted to engage one side of an emerging bale, said lug having a starting position enabling emergence of a bale and said device being rotatable to carry the lug in the direction of bale delivery from said starting position to a delivery position and said lug at said delivery position turning about said device to disengage from the bale and thereby accelerating to cause the bale to depart by its own momentum beyond said device; selectively engageable and disengageable power-operated mechanism on the baler and connected to the bale-throwing means, said mechanism being disengaged when the lug is in its starting position and engageable to drive the lug to its delivery position and back to said starting position; and control means for effecting engagement of the power-operated mechanism, including a bale-sensing device operative automatically, in response to a bale-forming condition including emergence of a bale to said support, to engage the mechanism for driving the device as aforesaid.

9. The invention defined in claim 1 in which: the bale-discharge portion causes the bales to emerge horizontally; the bale support extends rearwardly and upwardly from said portion; each sprocket is mounted on a shaft and each shaft is substantially normal to the support, and the shafts for the front sprockets depend below the support; the drive means interconnecting the two-bale-throwing means includes a cross shaft transverse to the support and intermeshing gearing on said cross shaft and on the depending front shafts; and the power-operated mechanism is connected to the cross shaft.

10. The invention defined in claim 2 in which: the bale-discharge portion causes the bales to emerge horizontally; the bale support extends rearwardly and upwardly from said portion; each rotatable device includes a shaft substantially normal to the support and depending below the support; the drive means interconnecting the two bale-throwing means includes a cross shaft transverse to the support and intermeshing gearing on said cross shaft and on the depending shafts; and the power-operated mechanism is connected to the cross shaft.

11. For a baler having bale-forming means including a bale-discharge portion from which individual completed bales emerge rearwardly in succession as the baler operates: bale-throwing apparatus for throwing each emerging bale distantly rearwardly from the bale-discharge portion of the baler, comprising a bale support having means thereon for connection thereof to the baler and extending rearwardly from the bale-discharge portion generally as an extension of said portion; a pair of fore-and-aft means on the support and spaced apart transversely of the path of the emerging bale as it enters the support, one of said fore-and-aft means including front and rear guide members respectively adjacent to and remote from the bale-discharge portion and an endless flexible element trained about said members to dispose an inner run of said element lengthwise as respects the path of the emerging bale, said run and said other of said fore-and-aft means lying in substantial parallelism and spaced apart on the order of the width of a bale so as to receive the bale therebetween, said other fore-and-aft means being operative to hold the bale against lateral displacement away from said element; drive means operative to drive the element to move said run rearwardly; said element including means movable therewith and engageable with the bale for transmitting said movement of said element to the bale to cause the bale to move rapidly rearwardly for ultimate departure distantly from the bale-discharge portion; and relatively high-speed power mechanism connected to and driving the drive means rapidly to cause the bale to depart from the apparatus by its own momentum.

12. For a baler having bale-forming means including a bale-discharge portion from which individual completed bales emerge rearwardly in succession as the baler operates: bale-throwing apparatus for throwing each emerging bale distantly rearwardly from the bale-discharge portion of the baler, comprising a bale support having means thereon for connection thereof to the baler and extending rearwardly from the bale-discharge portion generally as an extension of said portion; a pair of bale-throwing means on the support and spaced apart transversely of the path of the emerging bale as it enters the support, each bale-throwing means including front and rear guide members respectively adjacent to and remote from the bale-discharge portion and an endless flexible element trained about said members to dispose an inner run of each element lengthwise as respects the path of the emerging bale so that the inner runs are capacitated to receive such bale therebetween; drive means interconnecting the two bale-throwing means so that the inner runs thereof move rearwardly in unison; said elements respectively including means movable therewith and engageable with the bale for transmitting said movement of said elements to the bale to cause the bale to move rearwardly for ultimate departure distantly from the baler; and relatively high-speed power mechanism connected to and driving the drive means rapidly to cause the bale to depart from the throwing means by its own momentum.

13. In a baler, means including an endless conveyor positioned for throwing bales formed by the baler in a desired path, and means connected with said endless conveyor and constituted to start said conveyor only at such times as a bale is ready to be thrown, and stop said conveyor after such bale has been thrown.

14. In a bale thrower of the type adapted to receive a bale as it emerges from a baler and project said bale in a desired free path, the combination of a support, an endless conveyor operatively carried on the support, means guiding an emerging bale to the conveyor, and driving means for starting the conveyor, driving the conveyor in the direction to project a bale, and stopping the conveyor when the bale has been projected.

15. In a bale thrower of the type adapted to receive a bale as it emerges from a baler and project said bale in a desired free path, the combination of a support, an endless conveyor operatively carried on the support, means guiding an emerging bale to the conveyor, driving means for staritng the conveyor, driving the conveyor in the direction to project a bale, and stopping the conveyor when the bale has been projected, and means activated by the emergence of a bale and arranged to initiate the operation of said driving means.

16. In a bale thrower of the type adapted to receive a bale as it emerges from a baler and project said bale in a desired free path, the combination of a support, an endless conveyor operatively carried on the support, means for driving said endless conveyor cyclically at a speed which accelerates from zero to maximum, and decelerates to zero, in a direction to project a bale, means guiding an emerging bale to the conveyor, and means activated by the emergence of a bale and arranged to initiate a cycle of operation of said driving means.

17. In a bale thrower of the type adapted to receive a bale as it emerges from a baler and project said bale in a desired free path, the combination of a support, an endless conveyor operatively carried on the support, means for driving said endless conveyor cyclically at a continuously increasing acceleration from zero to a maximum speed, and decelerating to zero, in a direction to project a bale, means guiding an emerging bale to the conveyor, and means activated by the emergence of a bale and arranged to initiate a cycle of operation of said driving means.

References Cited

UNITED STATES PATENTS

| | | | |
|---|---|---|---|
| 1,853,253 | 4/1932 | Bennett | 198—160 X |
| 2,244,848 | 6/1941 | Olds | 198—128 X |
| 2,785,811 | 3/1957 | Forth | 214—83.3 |
| 2,812,052 | 11/1957 | Doyer | 198—128 |
| 2,756,865 | 7/1956 | Morrison et al. | |
| 3,132,754 | 5/1964 | Smoker et al. | |

PETER FELDMAN, *Primary Examiner.*

U.S. Cl. X.R.

198—160, 128; 214—83.3, 42

PO-1050
(5/69)

UNITED STATES PATENT OFFICE
CERTIFICATE OF CORRECTION

Patent No. 3,451,333        Dated 24 June 1969

Inventor(s) Murray W. Forth

It is certified that error appears in the above-identified patent and that said Letters Patent are hereby corrected as shown below:

Column 5, line 6, change the last word "device" to -- drive --; line 10, change "power-operaed" to --power-operated --; line 50, change "mcha-" to -- mecha- --; line 58, change "enemerging" to -- emerging --; line 64, change "bale-receving" to -- bale-receiving --. Column 6, line 56, change "bale" (2nd occ.) to -- baler --. Column 8, line 62, change "staritng" to -- starting --.

SIGNED AND
SEALED

MAR 24 1970

(SEAL)
Attest:

Edward M. Fletcher, Jr.
Attesting Officer

WILLIAM E. SCHUYLER, JR.
Commissioner of Patents